United States Patent
Kusumi et al.

(10) Patent No.: US 10,408,709 B2
(45) Date of Patent: Sep. 10, 2019

(54) DEVICE FOR DETERMINING WHEEL FASTENING STATE USING SERVER

(71) Applicant: NTN CORPORATION, Osaka (JP)

(72) Inventors: Yasutaka Kusumi, Iwata (JP); Yuichiro Noro, Le Mans (FR); Hiroya Kato, Iwata (JP); Kentaro Nishikawa, Iwata (JP)

(73) Assignee: NTN CORPORATION, Osaka (JP)

(*) Notice: Subject to any disclaimer, the term of this patent is extended or adjusted under 35 U.S.C. 154(b) by 89 days.

(21) Appl. No.: 15/815,244

(22) Filed: Nov. 16, 2017

(65) Prior Publication Data

US 2018/0095008 A1    Apr. 5, 2018

Related U.S. Application Data

(63) Continuation of application No. PCT/JP2016/064306, filed on May 13, 2016.

(30) Foreign Application Priority Data

May 19, 2015 (JP) .................. 2015-102075

(51) Int. Cl.
*G01M 17/00* (2006.01)
*G01M 17/013* (2006.01)
(Continued)

(52) U.S. Cl.
CPC ............. *G01M 17/013* (2013.01); *B60B 3/16* (2013.01); *G01L 5/00* (2013.01); *G01M 17/007* (2013.01); *B60R 16/027* (2013.01)

(58) Field of Classification Search
CPC ..... G01M 17/013; G01M 17/007; B60B 3/16; G01L 5/00; B60R 16/027
(Continued)

(56) References Cited

U.S. PATENT DOCUMENTS 8,096,173 B2    1/2012    Isono
8,567,240 B2    10/2013   Isono et al.
(Continued)

FOREIGN PATENT DOCUMENTS

CN    101669017    3/2010
JP    8-145767     6/1996
(Continued)

OTHER PUBLICATIONS

International Search Report dated Jun. 14, 2016 in corresponding International Patent Application No. PCT/JP2016/064306.
(Continued)

*Primary Examiner* — Max H Noori

(57) ABSTRACT

Provided is a device for determining a wheel fastening state that allows a wheel fastening state to be monitored during running. The device includes a sensor unit (3) that is attachable to and detachable from a wheel fastening part, an information terminal (4) that is an in-vehicle device (4A) or a portable terminal (4B), and a server (30). The terminal (4) includes a measurement instruction module (23) to read vehicle state data from a control and communication system (5) of a vehicle and send an instruction for to measurement to the sensor unit (3) at determined timing. The server (30) includes a first information processing module (32) configured to determine an abnormality of a fastening state of the wheel fastening part by comparing the measurement data with accumulated data that is measured under the same condition and stored in the past.

11 Claims, 13 Drawing Sheets

(51) Int. Cl.
*B60B 3/16* (2006.01)
*G01M 17/007* (2006.01)
*G01L 5/00* (2006.01)
*B60R 16/027* (2006.01)

(58) Field of Classification Search
USPC .......................................................... 73/761
See application file for complete search history.

(56) References Cited

U.S. PATENT DOCUMENTS

| | | | |
|---|---|---|---|
| 9,011,013 B2 | 4/2015 | Norimatsu et al. | |
| 2007/0251619 A1 | 11/2007 | Bertrand | |
| 2010/0071453 A1 | 3/2010 | Isono | |
| 2010/0274607 A1* | 10/2010 | Carresjo | B60C 23/0416 705/7.11 |
| 2011/0239752 A1 | 10/2011 | Isono et al. | |
| 2012/0197485 A1* | 8/2012 | Duan | G01M 17/013 701/32.9 |
| 2013/0261879 A1* | 10/2013 | Chen | G01M 17/025 701/31.8 |
| 2014/0086517 A1 | 3/2014 | Norimatsu et al. | |
| 2016/0282108 A1* | 9/2016 | Martinod Restrepo | B61K 9/12 |
| 2017/0088066 A1* | 3/2017 | Wang | B60K 37/00 |

FOREIGN PATENT DOCUMENTS

| | | |
|---|---|---|
| JP | 2004-272375 | 9/2004 |
| JP | 2005-309724 | 11/2005 |
| JP | 2006-72621 | 3/2006 |
| JP | 2007-127586 | 5/2007 |
| JP | 2007-271620 | 10/2007 |
| JP | 2009-146086 | 7/2009 |
| JP | 2010-151676 | 7/2010 |
| JP | 2011-203116 | 10/2011 |
| JP | 4860680 B2 | 1/2012 |
| JP | 5018444 | 9/2012 |
| JP | 5083314 B2 | 11/2012 |
| JP | 2013-32998 | 2/2013 |
| JP | 5455357 B2 | 3/2014 |
| JP | 2014-119275 | 6/2014 |

OTHER PUBLICATIONS

Notification of Reasons for Refusal dated Jan. 8, 2019 in corresponding Japanese Patent Application No. 2015-102075, 9 pages.
English Language Translation of International Preliminary Report on Patentability dated Nov. 30, 2017 in corresponding International Patent Application No. PCT/JP2016/064306.
Chinese Office Action dated Apr. 30, 2019 in corresponding Chinese Patent Application No. 201680028426.5 (9 pages).

* cited by examiner

STATE DETERMINE METHOD

DEVICE FOR DETERMINING WHEEL FASTENING STATE USING SERVER

CROSS REFERENCE TO THE RELATED APPLICATION

This application is a continuation application, under 35 U.S.C. § 111(a), of international application No. PCT/JP2016/064306, filed May 13, 2016, which claims Convention priority to Japanese patent application No. 2015-102075, filed May 19, 2015, the entire disclosure of which is herein incorporated by reference as a part of this application.

BACKGROUND OF THE INVENTION

Field of the Invention

The present invention relates to a determination device for a wheel fastening state at a wheel fastening part of an automobile.

Description of Related Art

In an automobile, particularly in a large-size commercial vehicle or the like, confirmation of a fastening state of each wheel is recognized to be important as prevention of a trouble such as falling-off of a wheel. Thus, management of tightening torque upon bolt fastening is required by law. As such confirmation of a fastening state, inspection is generally performed by checking appearance or hammering sound. However, there is no mass production technique that allows a fastening state during running to be determined with high accuracy, and thus daily inspection such as inspection prior to operation and inspection during operation is carried out in addition to periodical maintenance, thereby preventing occurrence of a fastening abnormality such as nut looseness Regarding appearance checking, there is a method in which, for example, after a nut is tightened, a circumferential phase between the nut and a wheel is indicated with a paint marker, or a cap from which a circumferential phase is recognized is assembled to the nut, thereby allowing a circumferential phase shift due to looseness to be easily detected. Regarding hammering sound checking, generally, the determination based on a rule of thumb of an inspector is the mainstream, but there is also a diagnosis tool in which an acceleration meter is incorporated into a hammering device and a change in resonant frequency due to nut looseness or bolt damage is detected.

As a mass production technique to monitor the state of a wheel assembly during running, there are TPMS (tire pressure monitoring system) and the like, and a method for detecting tire action force for vehicle control has also been proposed (for example, Patent Documents 1 to 3). In a device for detecting the tire action force, an elastic body including a columnar portion and a plate portion is disposed between a wheel support portion (hub) and a wheel, and action force applied to a tire ground-contact surface is calculated and detected from information such as stress and strain occurring at each part. In this device, a stress concentration portion that increases strain is formed on the plate portion, but a specific idea thereof is not described in any of the Patent Documents.

RELATED DOCUMENT

Patent Document

[Patent Document 1] JP Patent No. 4860680
[Patent Document 2] JP Patent No. 5455357
[Patent Document 3] JP Patent No. 5083314

SUMMARY OF THE INVENTION

The above-described methods and devices for confirming a fastening state have the following problems.

(i) In the conventional confirmation methods by appearance and hammering sound, an abnormality such as nut looseness and bolt breakage cannot be detected during running.

(ii) In the case of the determination based on a rule of thumb of an inspector, there are variations in detection accuracy.

(iii) It is difficult to perform abnormality determination in which a disturbance occurring due to the use environment (a load amount, acceleration/deceleration, turning, a road surface condition, a tire condition, a deterioration condition of a vehicle) of the vehicle is taken into consideration.

(iv) As in the devices disclosed in the above Patent Documents, when an elastic member is provided so as to be connected and fixed between a hub and a wheel, the structure becomes complicated, the cost increases, the vehicle weight and the axle width increase, and the support rigidity of the vehicle is also influenced.

To solve these problems, a system has been proposed in which a sensor unit is installed in a wheel fastening part, an in-vehicle device or a portable terminal analyzes measurement data of the sensor unit and performs determination as to a fastening abnormality. However, this system also has the following problems.

(i) The measurement data and analysis data are stored in the in-vehicle device or the portable terminal, data stored thereon is limited to a certain amount.

(ii) Since the in-vehicle device or the portable terminal analyzes or determines the state, the processing takes time.

(iii) Work for update at the time of revision of the analysis method or criterion is complicated (a time lag occurs from an instruction for the update to completion of the update).

(iv) Data management and/or vehicle state monitoring at a vehicle management department is difficult.

(v) Evaluation is made on a stand-alone basis for each vehicle, and thus there is a possibility that a problem that has already occurred at the time of setting cannot be detected. That is, in some cases, a problem has already occurred at the time of initialization of the criterion, for example, a nut has been initially loose or the air pressure of a tire has been initially inappropriate.

An object of the present invention is to provide a wheel fastening state determination device that allows a wheel fastening state to be monitored during running and also allows abnormality determination, in which influence due to a running condition is reduced, to be performed, and achieves improvement of maintenance accuracy, improvement of determination accuracy, and quantification of a criterion, and that achieves further improvement of maintenance accuracy due to accumulation of a large quantity of information, improvement of determination accuracy, and an increase in the speed of the state determination, owing to use of a server.

Hereinafter, for convenience of easy understanding, a description will be given with reference to the reference numerals in embodiments.

A server-using determination device for a wheel fastening state according to one aspect the present invention includes: a sensor unit 3 detachably installed in a wheel fastening part 2a at which a wheel assembly 2A is fastened to an axle of a vehicle 1, the sensor unit 3 being configured to detect a state quantity depending on a fastening state of the wheel fastening part 2Aa; an information terminal 4 connected to the sensor unit 3; and a server 30 connected to the information terminal 4.

The information terminal 4 includes a measurement instruction module 23 configured to read vehicle state data regarding the vehicle 1 from a control and communication system 5 of the vehicle 1 and send an instruction for measurement to the sensor unit 3 at timing for which the vehicle state data is taken into consideration, and a communication interface 22 for receiving measurement data from the sensor unit 3 and transmitting the measurement data to the server 30, and the server 30 includes a first information processing module 32 configured to determine an abnormality of the fastening state of the wheel fastening part 2Aa by comparing the measurement data with accumulated data that is measured for a determined item of the vehicle state data under the same condition and stored in the past.

According to this configuration, the sensor unit 3 detachably installed in the wheel fastening part 2Aa and configured to detect the state quantity depending on to the fastening state of the wheel fastening part 2Aa, is used. Thus, the wheel fastening state is allowed to be monitored during running, and sensors are easily attached to and detached from the vehicle. The information terminal 4 reads the vehicle state data by the measurement instruction module 23 and sends an instruction for measurement to the sensor unit 3 at the determined timing. The first information processing module 32 of the server 30 determines an abnormality of the fastening state of the wheel fastening part 2Aa by comparing the measurement data with the accumulated data that is measured under the same condition and stored in the past. Since measurement is performed at the time of the designated vehicle running condition, abnormality determination in which a disturbance such as influence due to a running condition is reduced is allowed to be performed, and improvement of determination accuracy, quantification of a criterion, and improvement of maintenance accuracy are achieved. Since the first information processing module 32 is provided in the server 30, abnormality can be determined with higher accuracy by using a large quantity of accumulated data, and the speed of processing of abnormality determination is improved by a high-speed processing function of the server 30.

The "control and communication system" includes a control device such as an ECU, and a communication device such as a CAN. The "vehicle state data" includes information such as an engine speed, a steering angle, a tire rotational speed (vehicle speed), an accelerator position, a status of brake operation, a gear position in a transmission, ON/OFF status of an ignition switch, and whether only an accessory system is powered on. The "item" includes an item such as the engine speed, the steering angle, the tire rotational speed, the accelerator position, the status of brake operation, and the like, which are used for inference of a vehicle running condition. The phrase "measured under the same condition" does not indicate the exact sameness, and it is sufficient if it is the same in distinction among during idling, during steady running (straight running at a constant speed), during running on a stable road surface, and the like.

In a preferred embodiment, the server-using determination device may further include communication devices 22, 26, and 31 for wirelessly performing communication between the sensor unit 3 and the information terminal 4 and communication between the information terminal 4 and the server 30. The first information processing module 32 may store the measurement data and may determine the abnormality. The information terminal 4 may include a display module 25 configured to display a determination result transmitted from the server 30, on a screen of a display device.

Since communication between the sensor unit 3 and the information terminal 4 is wirelessly performed, wiring between the rotating wheel assembly 2A and the stationary information terminal 4 is simplified. Since communication between the information terminal 4 and the server 30 is also wirelessly performed, the information terminal 4 may be an in-vehicle device 4A or a portable terminal 4B, and can perform communication with the server 30 from the vehicle that is running. Since the determination result is displayed on the screen of the information terminal 4, the driver or the like on the running vehicle can recognize the determination result of the fastening abnormality.

In a preferred embodiment, the information terminal 4 may include a second information processing module 24 configured to determine an abnormality of the fastening state of the wheel fastening part 2Aa based on the measurement data by using the vehicle state data.

Sometimes communication between the server 30 and the running vehicle can be unavailable. Even in such a case, since the information terminal 4 includes the second information processing module 24, it is possible to determine an abnormality of the fastening state of the wheel fastening part 2Aa. The information terminal 4 cannot handle a large quantity of past accumulated data as much as the server 30 can, and the operation speed thereof is limited, but determination as to an abnormality of the fastening state can be performed with accuracy within a practical range.

In a preferred embodiment, the server 30 may include a comparison and notification module 33 configured to: when some sort of an abnormality is determined from the measurement data, compare the measurement data from which the abnormality is determined, with measurement data of another similar vehicle; and, if a situation with a similar tendency or a similar level is found between both measurement data as a result of the comparison, notify a vehicle management department of the measurement data in which the situation with the similar tendency or the similar level is found, to call attention. At the time of initialization of the sensor unit 3, the comparison and notification module 33 can detect a problem at the time of initialization of a criterion due to a fastening failure or inappropriate tire air pressure at the initial stage or the like by comparing each measurement data with other vehicle data of a similar type of a vehicle.

The comparison and notification module enables the driver of the other vehicle, an operation management department, or the like to pay attention when an abnormality occurs.

In a preferred embodiment, the sensor unit 3 may include: a ring spacer 12 provided over an entire periphery of the wheel assembly 2A and interposed between respective head portions 7a of a plurality of hub bolts 7 and a plurality of wheel nuts 8 associated with the respective hub bolts 7 so as to receive tightening force by the plurality of hub bolts 7 and the plurality of wheel nuts 8, the spacer 12 having a plurality of bolt holes 11 that are formed at a plurality of circumferential phase parts, respectively, the plurality of hub bolts being inserted through the plurality of hub holes 7, respectively, to mount a wheel of the wheel assembly to a hub, the ring spacer being deformable due to the tightening force; and at least one strain sensor 13 provided between at least two bolt holes 11 of the plurality of bolt holes 11, the at least one strain sensor being configured to measure strain of the deformed spacer 12.

In the case of the sensor unit 3 having this configuration, since strain of the spacer 12 is measured and an abnormality of the fastening state of the wheel nut 8 is detected, an abnormality of the fastening state during running of the vehicle can be detected. Since the deformable spacer 12 is a ring member interposed between the head portions 7a of the hub bolts 7 and the wheel nuts 8 and the strain sensor 13 is mounted on the spacer 12, the structure is simple and influence on support rigidity of a wheel 2 is also small.

Sensors are easily attached to and detached from the vehicle, and influence thereof on the vehicle weight and the axle width can be reduced.

In a preferred embodiment, the strain sensor 13, a communication device 16, and a power source 17 may be provided on the spacer 12 and at a circumferential phase part between the at least two bolt holes 11, the communication device 16 being configured to communicate a detection signal of the strain sensor 13, the power source 17 being configured to supply power to the strain sensor 13 and the communication device 16.

The communication device 16 and the power source 17 are needed for detection by the strain sensor 13 and communication of a detection signal thereof. Since the communication device 16 and the power source 17 are disposed in the circumferential phase part between the bolt holes 11 of the spacer 12, the sensor unit 3 can be made compact. The spacer 12 is required to ensure contact areas with the hub, the wheel, and the like is needed to be ensured at the circumferential phase part, in which each bolt hole 11 is present, to some extent for tightening, but the circumferential phase part between the bolt holes 11 may not be in contact with the hub, the wheel, and the like (may be thinned). Thus, for example, by disposing the communication device 16 and the power source 17 within a space produced by the thinning, the communication device 16 and the power source 17 can be disposed without increasing the thickness of the entire sensor unit 3.

In a preferred embodiment, the circumferential phase part between the bolt holes 11 may be formed with a thin portion 12b.

The thin portion 12b can be used as a mount part for the sensor, the communication device 16, the power source 17, and the like, and can prevent the mounted sensor and the like from protruding from the thickness of the entire spacer 12. Thus, the spacer 12 can be interposed between members with no difficulty. The thin portion 12b described above enables strain to be concentrated, so that the sensitivity of strain measurement can be improved and the accuracy of the determination as to an abnormality of the fastening state can be improved.

In a further preferred embodiment, the spacer 12 may include a thinnest portion 12c at a portion of the circumferential phase part formed with the thin portion between the at least two bolt holes 11, and the at least one strain sensor 13 may measure strain of the thinnest portion 12c, the thinnest portion serving as a strain concentration portion.

The thinnest portions 12c described above enables strain of the spacer 12 to be further concentrated, so that the sensitivity of strain measurement and the accuracy of the determination as to an abnormality of the fastening state can be further improved.

In a preferred embodiment, the sensor unit 3 may further include: a temperature sensor 14; and at least one of an acceleration sensor 15, a gyro sensor (not shown), and a rotation sensor (not shown).

A measured value of strain of the strain sensor 13 varies depending on temperature. Thus, for improvement of the accuracy of the determination as to an abnormality of the fastening state, it is preferable to measure the temperature with the temperature sensor 14 and perform temperature correction. The temperature sensor 14 also enables abnormal heat generation due to brake drag to be detected. The acceleration sensor 15 enables an abnormality such as damage of a hub bearing due to vibration and tire puncture to be detected. When at least either the gyro sensor or the rotation sensor is provided, detection of the attitude of a wheel 2 or various states using rotation angle information of each wheel can be performed.

In a preferred embodiment, the at least one strain sensor 13 may include: a diaphragm 13a mounted on the spacer 12, the diaphragm 13a being deflectable in response to deformation of the spacer 12; and a sensor element 13b mounted on the diaphragm 13a, the sensor element 13b being configured to measure deflection of the diaphragm 13a.

Even when the diaphragm 13a is provided on the spacer 12 itself, strain of the spacer 12 can be sensitively measured.

A server-using determination device for a wheel fastening state according to another aspect of the present invention includes: a sensor unit detachably installed in a wheel fastening part at which a wheel assembly is fastened to an axle of a vehicle, the sensor unit being configured to detect a state quantity depending on a fastening state of the wheel fastening part; an information processing terminal connected to the sensor unit so as to allow transmission and reception of a signal, the information processing terminal including a first processor; and a server connected to the information terminal so as to allow transmission and reception of a signal, the server including a second processor.

The first processor is programmed: to read vehicle state data regarding the vehicle from a control and communication system of the vehicle and send an instruction for measurement to the sensor unit at timing for which the vehicle state data is taken into consideration; and to receive measurement data from the sensor unit and transmit the measurement data to the server. The second processor is programmed to determine an abnormality of the fastening state of the wheel fastening part by comparing the measurement data with accumulated data that is measured for a determined item of the vehicle state data under the same condition and stored in the past.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
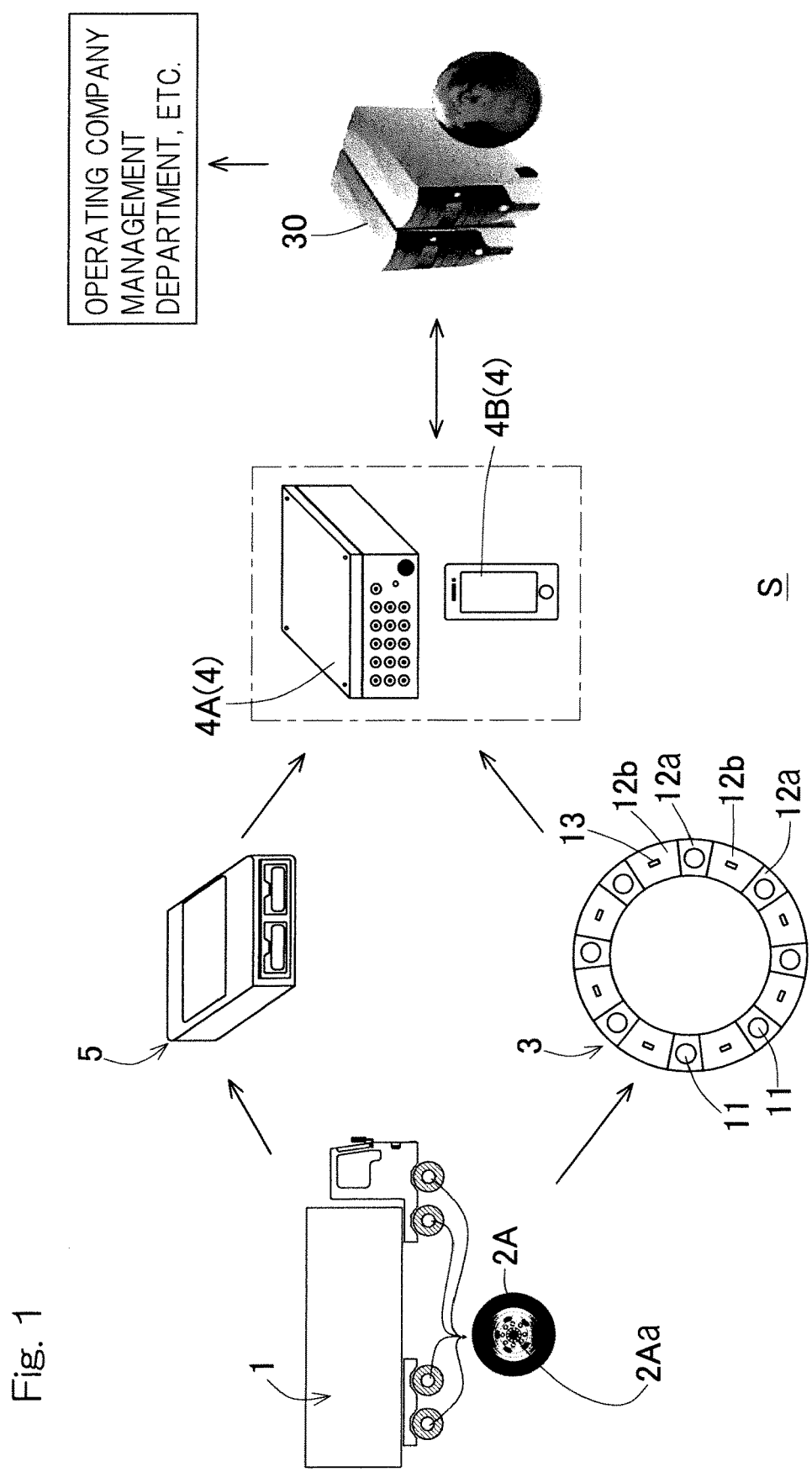
FIG. 1 is an explanatory diagram showing an outline of a server-using determination device for a wheel fastening state according to a first embodiment of the present invention.

A first embodiment of the present invention will be described with reference to the drawings. FIG. 1 shows the entirety of a system in which a server-using determination device S for a wheel fastening state according to the first embodiment is adopted for a large-size commercial vehicle. The server-using determination device is a device for determining a wheel fastening state by using a server as described later. The server-using determination device is also referred to as merely "determination device" below. The server-using determination device S includes: a spacer type sensor unit 3, which is mounted in a corresponding wheel fastening part 2Aa that fastens a wheel assembly 2A of a vehicle 1 to an axle; an information terminal 4; and a server 30. In FIG. 1, the vehicle 1 is a truck that is a large-size commercial vehicle. The sensor unit 3 detects a state quantity such as strain that changes in response to a fastening state of the wheel fastening part 2Aa. The information terminal 4 is composed of an in-vehicle device 4A, a portable terminal 4B such as a portable terminal, or the like. The information terminal 4 performs extraction of vehicle state data, sending an instruction for measurement at set timing, storage of measurement data of each sensor unit 3 and vehicle information, transmission of the measurement data and the vehicle information to the server 30, display of a determination result as to the fastening state on the server 30, and the like by using a CAN and an ECU mounted in the vehicle. The in-vehicle device 4A is an in-vehicle-type computer or the like. The portable terminal 4B is a mobile phone such as a so-called smartphone that includes an information processing function, or a portable type terminal machine dedicated for determining a wheel fastening state or dedicated for maintenance including another maintenance purpose. The server 30 is composed of a general-purpose computer or a high-performance personal computer and has a database (not shown).

The information terminal 4 is wirelessly connected to a control and communication system 5 of the vehicle 1. The control and communication system 5 includes a control system such as a main ECU (electronic control unit) of the vehicle 1, and a communication system such as an in-vehicle network composed of a CAN (controller area network). The information terminal 4 may be connected to device for detecting vehicle state data such as a speed sensor, directly by means of the communication system, not via the control system.

The server 30 has a function as a data server to accumulate measurement data, determination data, vehicle information, and the like, and a function as a high-speed arithmetic processing device to perform state determination as to a fastening abnormality or the like, update of a criterion for the state determination, transmission of a determination result, and the like. The determination result is transmitted to the information terminal 4, which is the in-vehicle device 4A and/or the portable terminal 4B, a management department of an operating company, and the like. The server 30 and the information terminal 4 are connected to each other via a LAN (local area network) or a WAN (wide area network).

Figure 2:
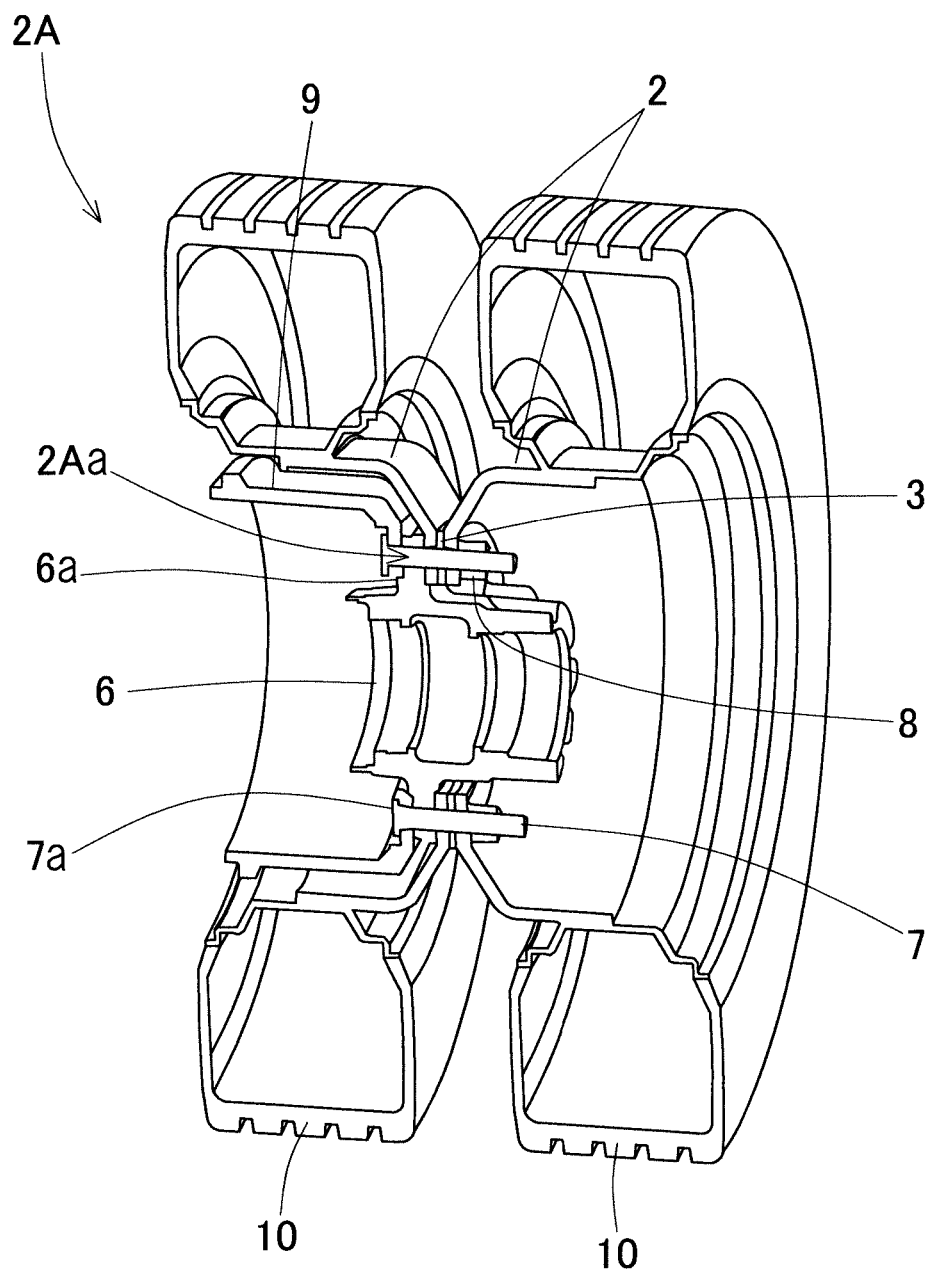
FIG. 2 is a cutaway perspective view showing a portion of a wheel assembly in the determination device in FIG. 1 in which a sensor unit is mounted.

FIG. 2 is a diagram in which the sensor unit 3 is mounted in a rear wheel double wheel part in a large-size commercial vehicle 1, and is a cross-sectional view taken along a plane passing through the rotation axis of the rear wheel double wheel part. In the wheel assembly 2A, two wheels 2, 2 are placed on one surface of a flange 6a of a hub 6 so as to face in directions opposite to each other, and a brake drum 9 is placed on the other surface of the flange 6a. The wheels 2, 2 and the brake drum 9 are interposed and fastened between head portions 7a of hub bolts 7 and respective wheel nuts 8. The wheel fastening part 2Aa that fastens the wheel assembly 2A to the axle (not shown) is formed at a location where the wheels 2, 2 are interposed between the head portions 7a of the hub bolts 7 and the wheel nuts 8 and fastened to the flange 6a of the hub 6. The hub bolts 7 are provided at a plurality of locations in the circumferential direction of the hub 6, and inserted into bolts hole formed in the flange 6a, the wheels 2, 2, and the brake drum 9. The hub 6 is installed on the outer circumference of the axle (not shown), and may be a component forming a part of a hub bearing (that is, a wheel bearing), or may be a component provided separately from the hub bearing. Tires 10 are provided on the outer circumferences of the respective wheels 2, 2. The wheels 2 and the tires 10 form the wheel assembly 2A.

The sensor unit 3 is a plate component having a circular ring shape concentric with each wheel 2. In this example, the sensor unit 3 is located between the two wheels 2, 2, is interposed between the head portions 7a of the respective hub bolts 7 and wheel nuts 8, which fasten the wheels 2. The sensor unit 3 has bolt holes 11 (FIG. 1) at a plurality of locations in the circumferential direction, and the hub bolts 7 are inserted into the bolt holes 11.

Figure 3A:
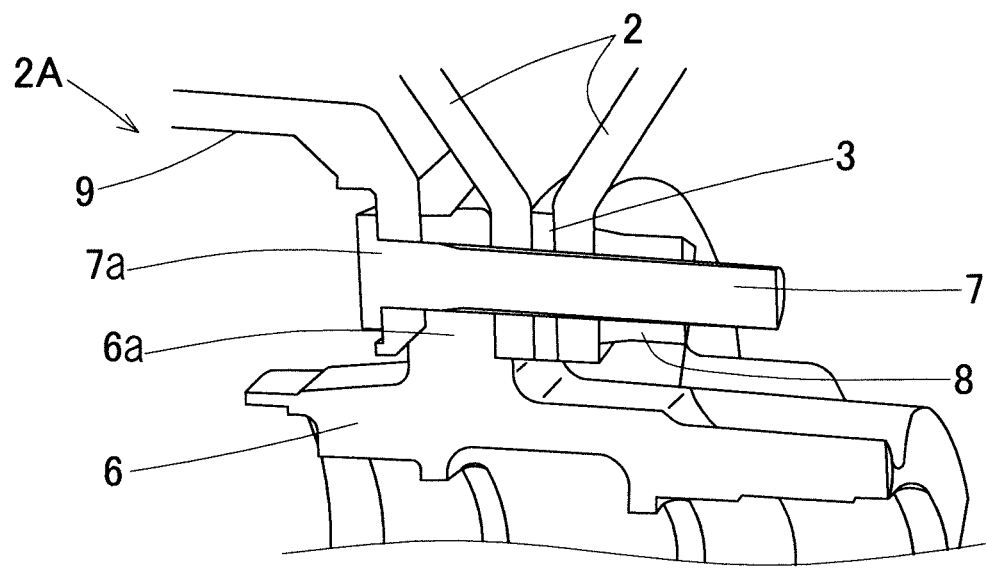
FIG. 3A is a partial perspective view showing a first example of a configuration of mounting the sensor unit in FIG. 2 to a wheel.
Figure 3B:
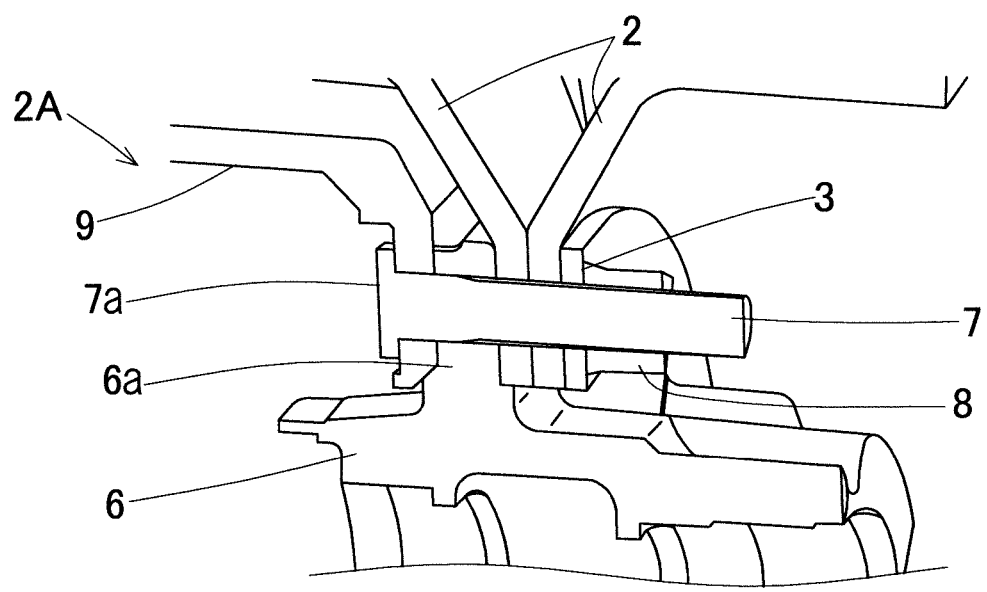
FIG. 3B is a partial perspective view showing a second example of the configuration of mounting the sensor unit in FIG. 2 to the wheel.
Figure 3C:
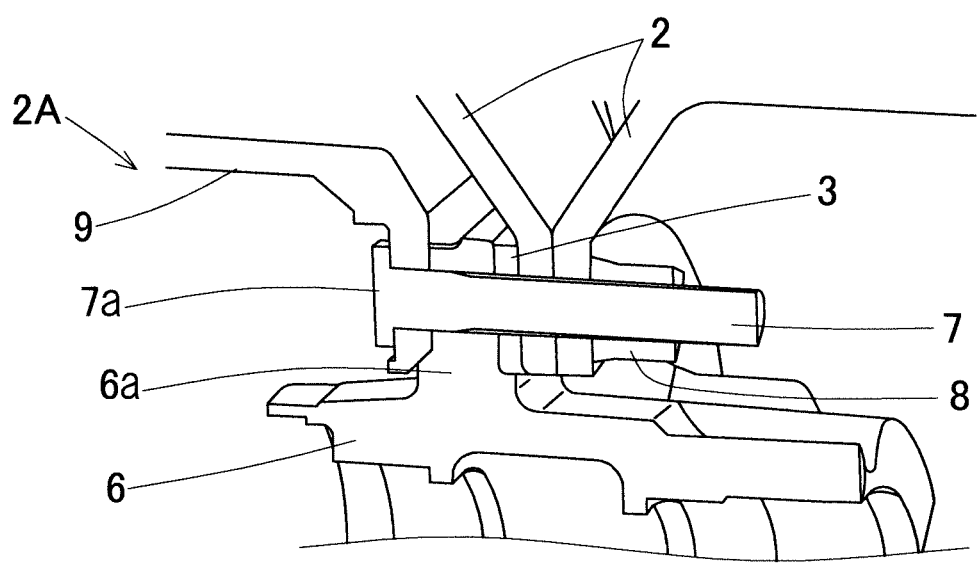
FIG. 3C is a partial perspective view showing a third example of the configuration of mounting the sensor unit in FIG. 2 to the wheel.

FIGS. 3A to 3C show a part, tightened by the wheel nut 8, of the sensor unit 3 in FIG. 2 in an enlarged manner.

The sensor unit 3 may be disposed between the two wheels 2, 2 as in a first mount example of FIG. 3A. Alternatively, the sensor unit 3 may be disposed between the wheel 2 and the wheel nuts 8 as in a second mount example of FIG. 3B. Further alternatively, the sensor unit 3 may be disposed between the flange 6a of the hub 6 and the wheel 2 as in a third mount example of FIG. 3C.

As long as the sensor unit 3 is disposed between the head portion 7a of the hub bolt 7 and the wheel nut 8, the sensor unit 3 may be disposed between the head portion 7a of the hub bolt 7 and the flange 6a of the hub 6, such as between the flange 6a of the hub 6 and the brake drum 9 and between the brake drum 9 and the head portion 7a of the hub bolt 7. However, the hub bolt 7 is generally press-fitted and fixed into the bolt hole of the flange 6a of the hub 6, and thus the sensor unit 3 is preferably disposed closed to the wheel nut 8 with respect to the flange 6a of the hub 6.

Although FIGS. 3A to 3C shows examples of the spacer-type sensor unit 3 disposed in the rear wheel double wheel part, the wheel assembly 2A to which the determination device for the wheel fastening state is applied may be of a front wheel single tire type.

Figure 4:
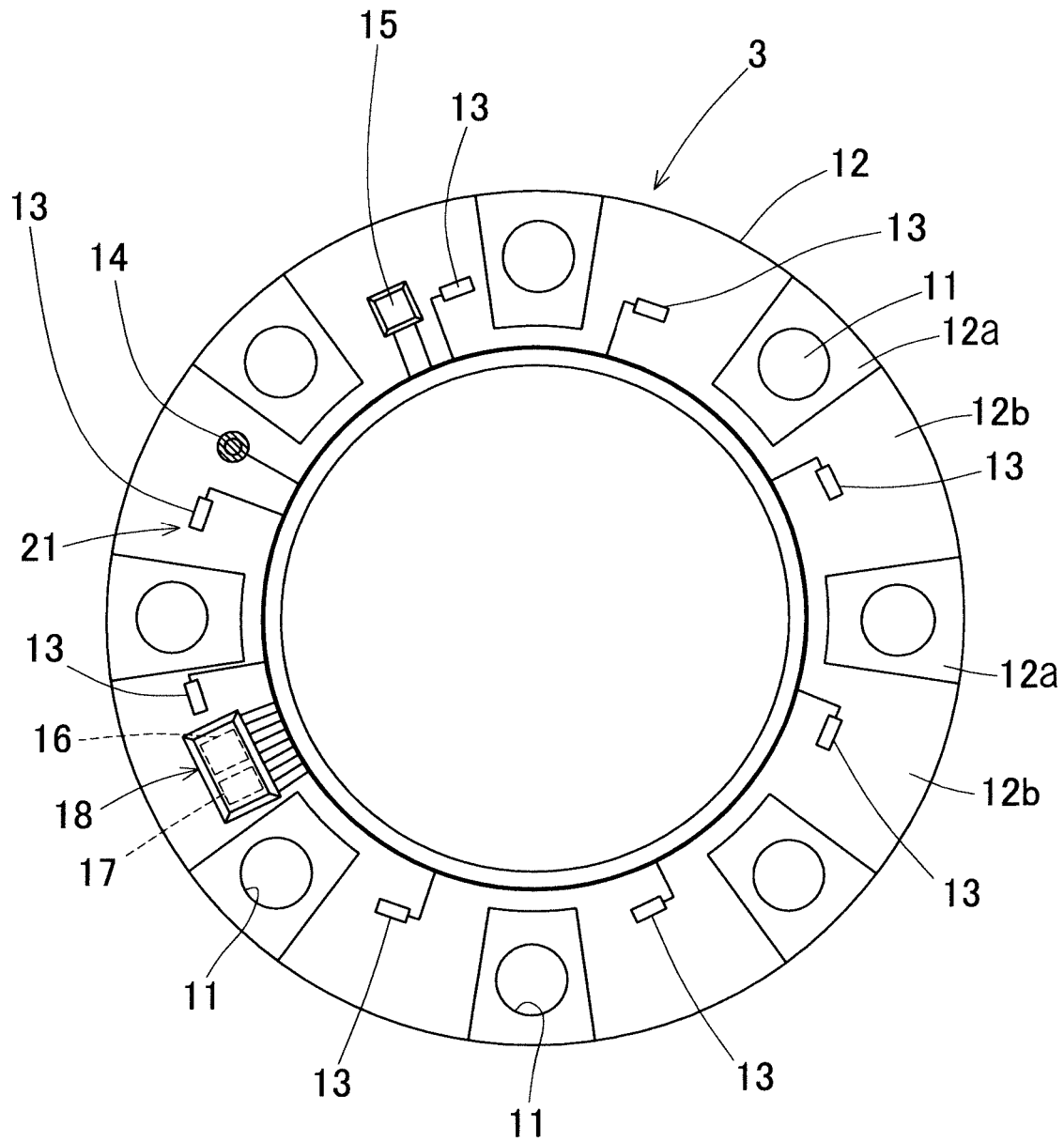
FIG. 4 is a front view of the sensor unit in FIG. 2.

FIG. 4 shows the sensor unit 3. The sensor unit 3 includes a plate ring spacer 12 and one or more strain sensors 13 mounted on the spacer 12. The strain sensors 13 are, for example, foil strain gauges, linear strain gauges, or semiconductor strain gauges. As a state detection sensor 21 that detects the state of a component such as the wheel 2, the strain sensors 13 and a temperature sensor 14 are mounted on the spacer 12. In addition, an acceleration sensor 15, a gyro sensor, and/or rotation sensor (that are not shown) may be provided. The state detection sensor 21 is a generic term for the respective sensors. A communication device 16 and a power source 17 are also mounted on the spacer 12. In this example, a power source and communication unit 18 that is a component onto which the communication device 16 and the power source 17 are integrated is used.

The spacer 12 is a member that deforms due to a difference in tightening force by the hub bolt 7 and the wheel nut 8 at parts of the hub. In the space member 12 the bolt holes 11 into which the respective hub bolts 7 are inserted are formed as described above. Regarding the material of the spacer 12, the spacer 12 may be formed from a metal material having high strength and high rigidity like an iron alloy, or may be formed from a metal material having relatively high elasticity like an aluminum alloy.

The spacer 12 has thick portions 12a described later. The spacer 12 has a shape in which any of a recess and a missing portion is not present in a region within the outermost diameter of each wheel nut 8, and this region is formed at thick portions 12a. With such a shape, axial force applied to a member involved in fastening of the wheel 2 is not impaired by tightening of the wheel nut 8, resulting in firm connection. In the case where the wheel nut 8 integrally has a washer portion (not shown), the outermost diameter covers the washer portion.

The spacer 12 further has thin portions 12b. Whereas a phase part at which each bolt hole 11 is present, that is, a portion surrounding each bolt hole 11, is the thick portion 12a, phase parts between the bolt holes 11 are the thin portions 12b. Each thin portion 12b may have a shape in which both main surfaces of the spacer 12 are recessed relative to the thick portions 12a, or may have a shape in which only one main surface of the spacer 12 is recessed relative to the thick portions 12a. The sensors such as the strain sensors 13, the temperature sensor 14, and the acceleration sensor 15, the communication device 16, the power source 17, and the power source and communication unit 18 are mounted on the phase parts between the bolt holes 11, which are the thin portions 12b. As shown in FIG. 4, the inner circumferential portion of the one main surface of the spacer 12 is entirely a thin portion and is used for wiring.

Figure 5A:
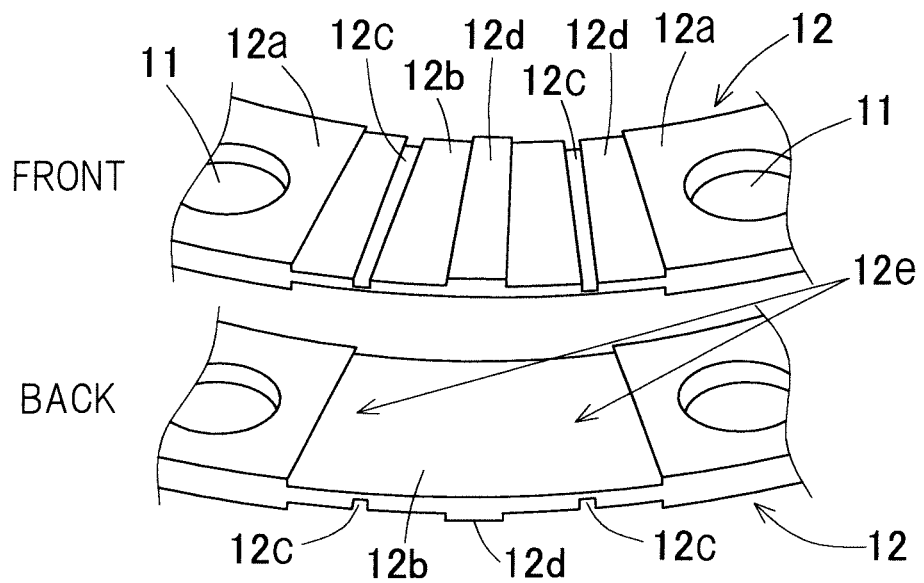
FIG. 5A is a partial perspective view showing a first example of a thin portion in the sensor unit in FIG. 2 from the front side and the back side.
Figure 5B:
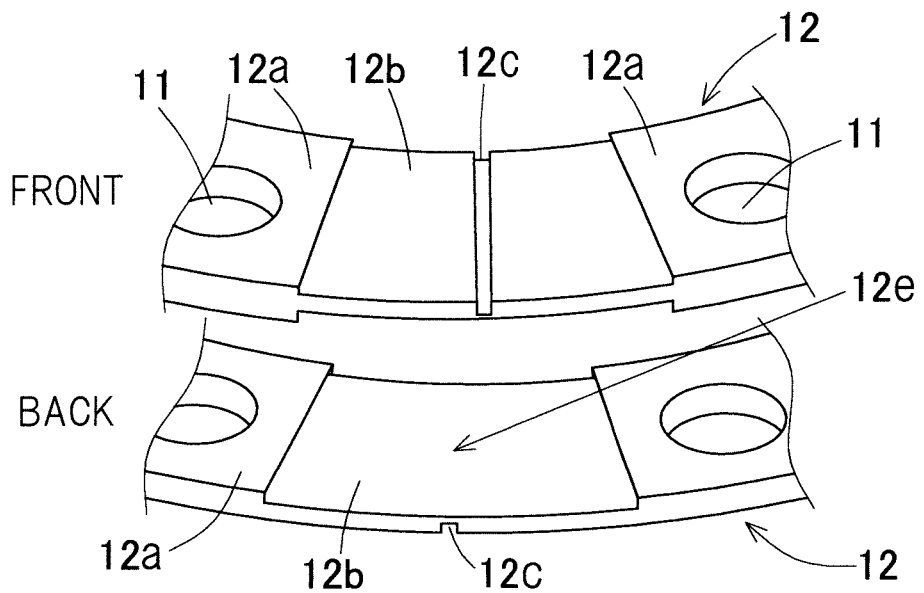
FIG. 5B is a partial perspective view showing a second example of the thin portion in the sensor unit in FIG. 2 from the front side and the back side.
Figure 5C:
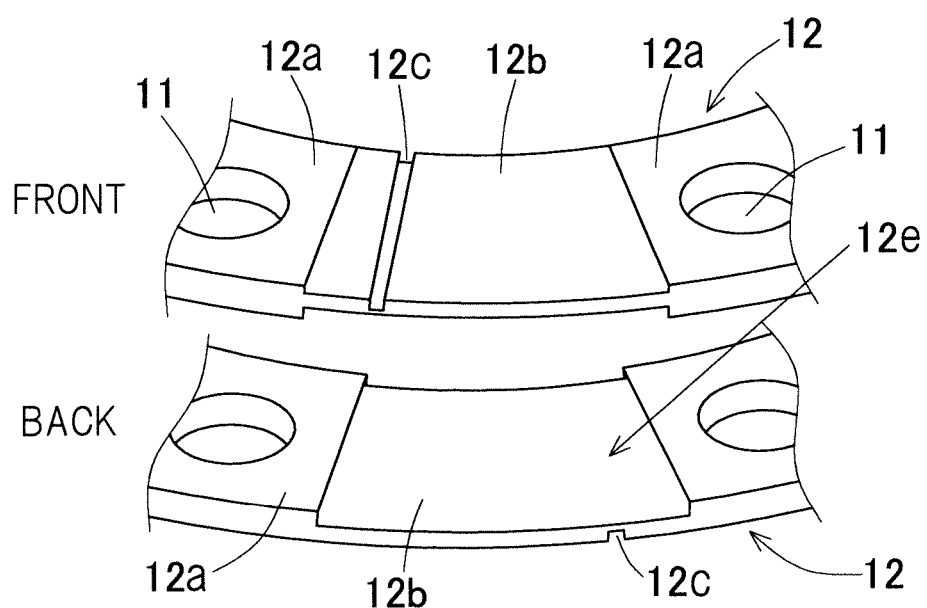
FIG. 5C is a partial perspective view showing a third example of the thin portion in the sensor unit in FIG. 2 from the front side and the back side.

The spacer 12 may further have thinnest portions 12c, which are strain concentration portions, within the phase parts that are the thin portions 12b, for example, as shown in FIGS. 5A to 5C.

In a first example of FIG. 5A, at the thin portion 12b, both main surfaces of the spacer 12 are recessed relative to the thick portions 12a, and an intermediate projection portion 12d is formed on the front surface of the spacer 12 and at the center of the phase part between the bolt holes 11 so as to be flush with the thick portions 12a and extend in the radial direction, whereby the thin portion 12b is divided into two sections aligned in the circumferential direction. Grooves are formed on the respective divisional sections so as to extend in the radial direction, and bottom portions of the grooves are the thinnest portions 12c. The thinnest portions 12c are sensor-mounting positions 12e.

In each of second and third examples of FIGS. 5B and 5C, the intermediate projection portion 12d in FIG. 5A is not present, and thus the thin portion 12b is continuous over the entire phase part between the bolt holes 11. In the second example of FIG. 5B, a groove is formed at the center in the circumferential direction in the thin portion 12b so as to extend in the radial direction, and a bottom portion of the groove is the thinnest portion 12c. In the third example of FIG. 5C, the thinnest portion 12c is formed by a groove similarly to the second example of FIG. 5B, but is displaced in the circumferential direction from the midpoint between the bolt holes 11. In FIGS. 5B and 5C, the thinnest portions 12c are the sensor-mounting positions 12e.

In the first to third examples of the form of the thin portion, the strain sensors 13 (FIG. 4) may be mounted at the back side of the thinnest portions 12c, that is, on the main surface at the side opposite to the grooves forming the thinnest portions 12c. Alternatively, the strain sensors 13 may be mounted on the bottom portions of the grooves that are the thinnest portions 12c. In any of these cases, each strain sensor 13 measures strain concentrated on the thinnest portion 12c. FIGS. 5A to 5C each show the front and the back of the shown phase part inverted therebetween. Thus, the position of each thinnest portion 12c is represented so as to be inverted between the drawing showing the front and the drawing showing the back.

Figure 11A:
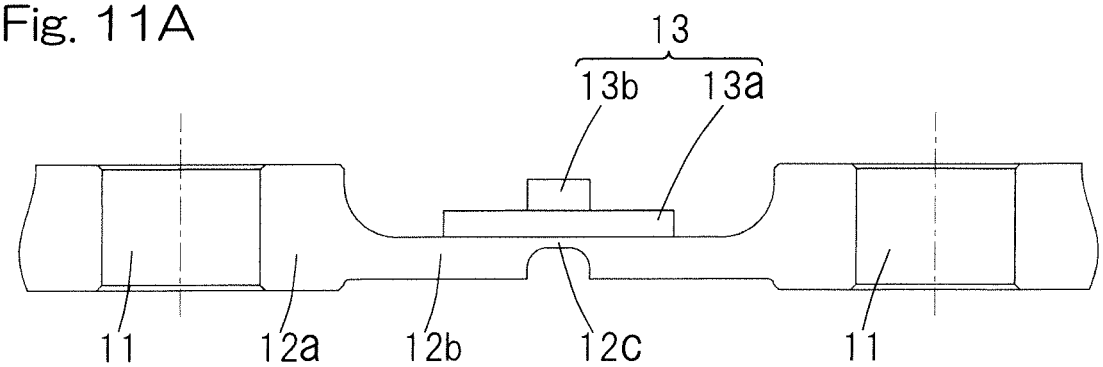
FIG. 11A is a cross-sectional view showing a first application example of a first diaphragm strain sensor in the sensor unit in FIG. 2.
Figure 11B:
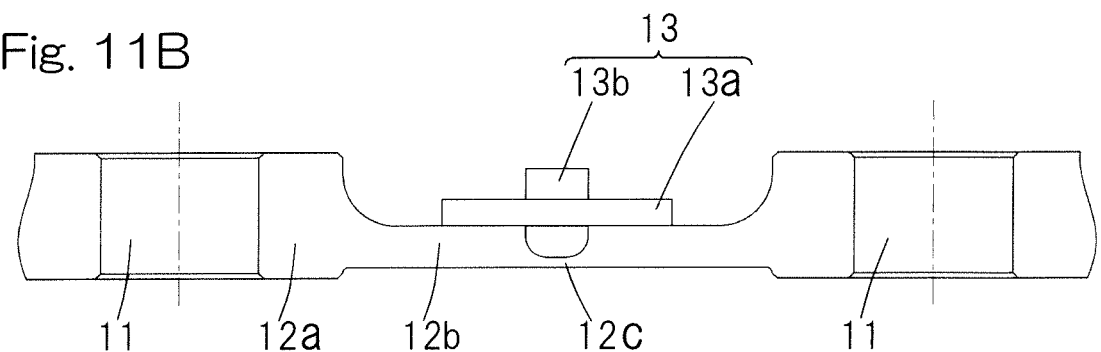
FIG. 11B is a cross-sectional view showing a second application example of the diaphragm strain sensor in FIG. 11A.
Figure 12A:
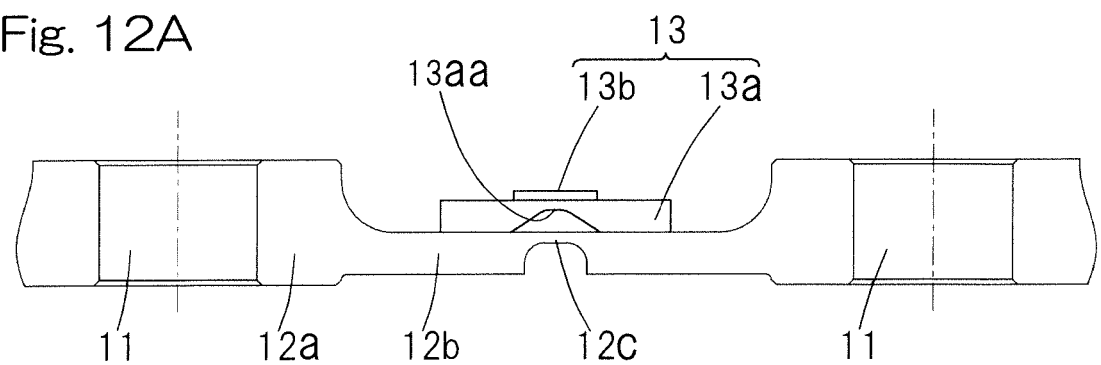
FIG. 12A is a cross-sectional view of a first application example of a second diaphragm strain sensor in the sensor unit in FIG. 2.
Figure 12B:
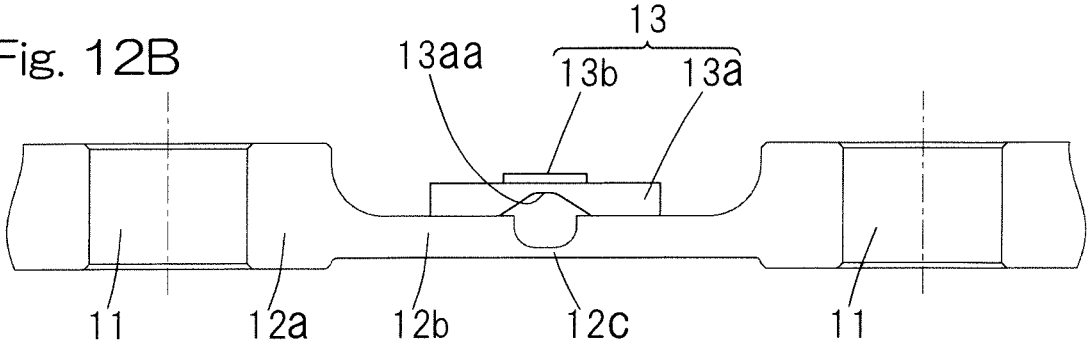
FIG. 12B is a cross-sectional view showing a second application example of the diaphragm strain sensor in FIG. 12A.

On the spacer 12, as shown in a first example of a strain sensor in FIGS. 11A and 11B, a diaphragm strain sensor 13 that measures strain may be mounted. The diaphragm strain sensor 13 includes a diaphragm 13a and a sensor element 13b that measures strain of the diaphragm 13a. As shown in a second example of FIGS. 12A and 12B respectively corresponding to FIGS. 11A and 11b, a thin portion 13aa may be formed in the diaphragm 13a. A strain sensor 13b may be provided on the thin portion 13aa so as to measure strain of the thin portion 13aa. Accordingly, the sensitivity and the accuracy of measurement of the diaphragm strain sensor 13 further improve.

The spacer 12 is composed of a single member in each of the above examples, but may be a spacer obtained by combining a plurality of spacer components (not shown).

Figure 6:
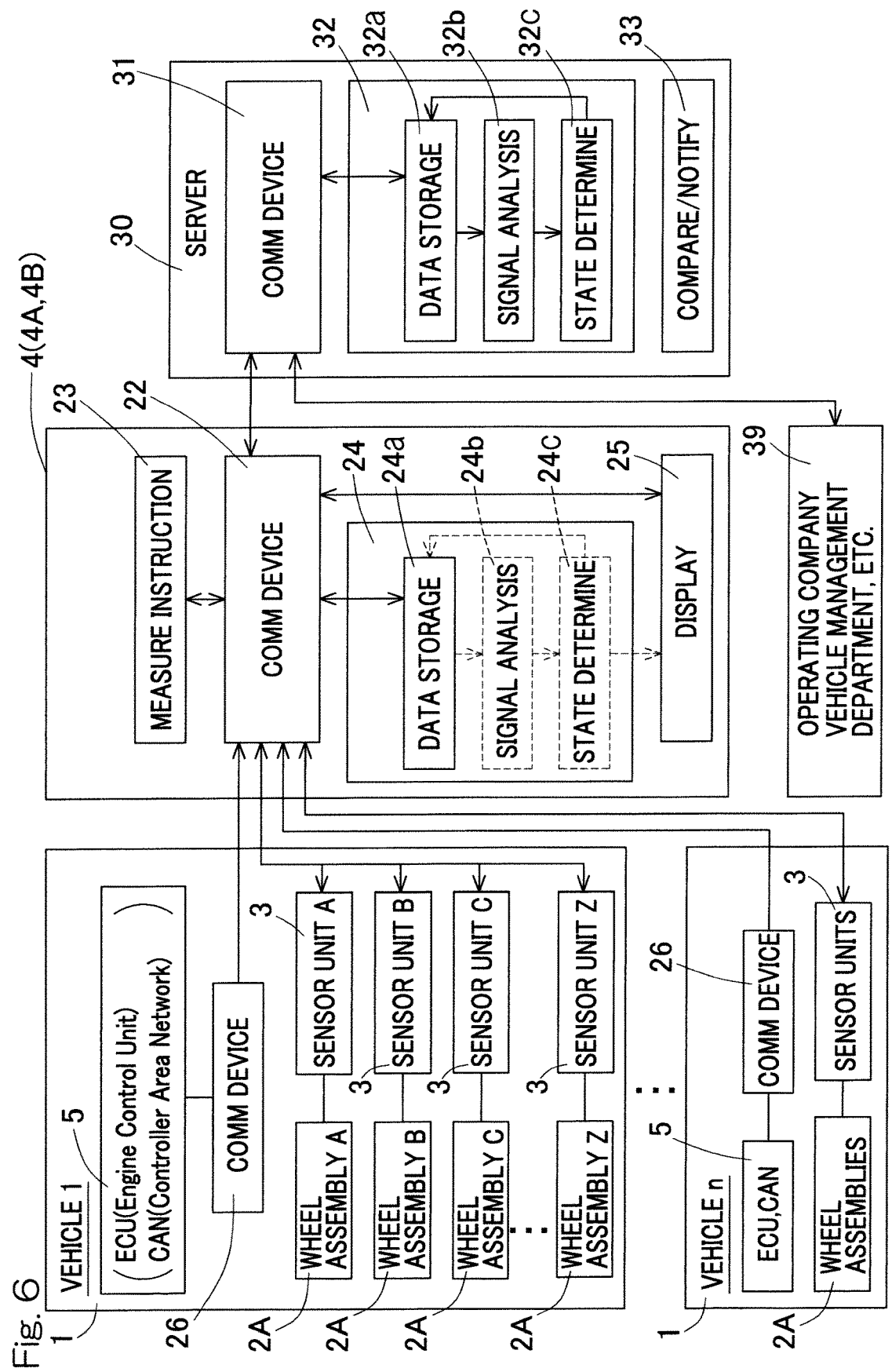
FIG. 6 is a block diagram showing a conceptual configuration of the server-using determination device in FIG. 1.
Figure 7:
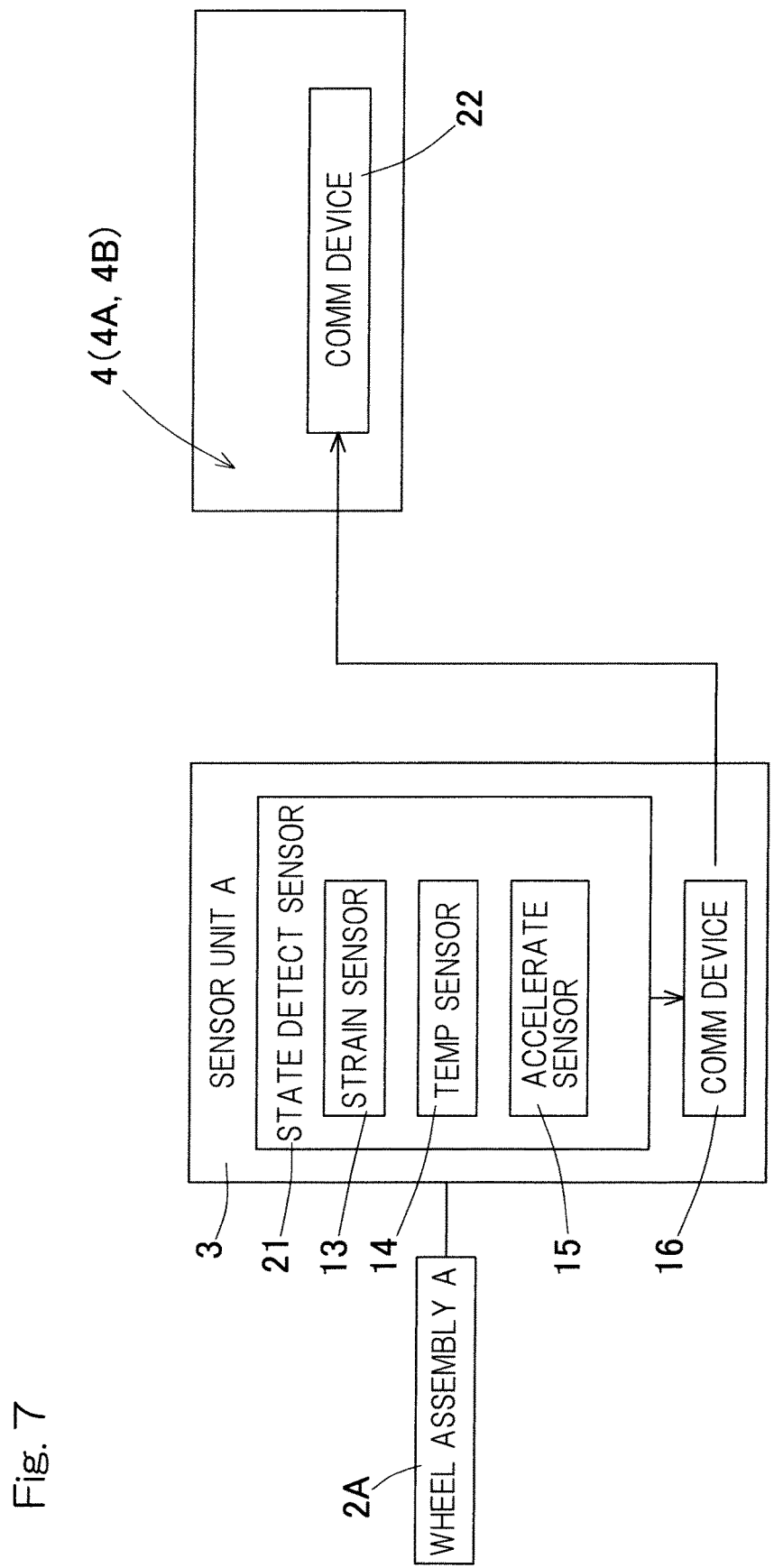
FIG. 7 is a block diagram showing the relationship between the sensor unit in FIG. 2 and an information terminal.

FIG. 6 is a block diagram showing the system configuration of the server-using determination device S for the wheel fastening state. The sensor unit 3 is provided at each of a plurality of wheel assemblies 2A of each of multiple vehicles 1 to n. As shown in FIG. 7, each sensor unit 3 includes the state detection sensor 21, which includes the strain sensors 13, the temperature sensor 14, and the acceleration sensor 15, and the communication device 16, which performs communication of detection data of the state detection sensor 21. In the case of a double wheel, as shown in FIG. 2 and FIGS. 3A to 3C, one sensor unit 3 is provided to the two wheels 2, 2 forming the double wheel. The information terminal 4 includes a communication device 22, which communicates with the communication device 16 of each sensor unit 3.

In FIG. 6, one information terminal 4 that is the in-vehicle device 4A, the portable terminal 4B, or the like is provided for a plurality of sensor units 3 (e.g., all the sensor units 3 included in one vehicle 1). The information terminal 4 can be used for another vehicle 1. In FIG. 6, reference characters "A to Z" shown in the blocks of the wheel assemblies 2A and the sensor units 3 are reference characters for identifying individual pairs of the wheel assemblies 2A and the sensor units 3. The wheel assemblies 2A and the sensor units 3 provided in the wheel assemblies 2A are denoted by the same reference characters "A to Z". In FIG. 6, arrows indicate flow of detection data.

The information terminal 4 is connected to the plurality of sensor units 3 through the communication device 22 as described above. The information terminal 4 is also connected to the control and communication system 5, which includes the ECU and the CAN, through a communication device 26 thereof via the communication device 22. The respective communication devices 16 (FIGS. 7), 22, 26, and 31, in each sensor unit 3, the information terminal 4, the control and communication system 5, and the server 30, perform wireless communication in compliance with a standard of short-range wireless communication (e.g., Bluetooth (registered trademark)). The information terminal 4 is also connected to the communication device 31 of the server 30 through the communication device 22. Communication between the information terminal 4 and the server 30 through the communication devices 22 and 31 complies with a communication standard for mobile phones such as LAN, WAN, or LTE (Long Term Evolution). The communication device 22 of the information terminal 4 is shown by one block collectively as means for performing communication with each sensor unit 3 and means for performing communication with the server 30.

The information terminal 4 mainly includes a computer and a program. The information terminal 4 includes a measurement instruction module 23, a second information processing module 24, and a display module 25 in addition to the communication device 22. The second information processing module 24 operates when communication between the information terminal 4 and the server 30 is not available. The display module 25 outputs an image to be displayed on a screen composed of a liquid crystal display device (not shown) or the like. Specifically, the display module 25 displays various determination results and abnormality factors that are transmitted from the server 30 and received by the information terminal 4, results of determination by the second information processing module 24 and abnormality factors that are held by the information terminal 4, and the like on the screen. That is, a processor of the information terminal 4 is programmed to execute the measurement instruction module 23, the second information processing module 24, and the display module 25.

The measurement instruction module 23 reads vehicle state data that is information regarding the state of running of the vehicle, from the control and communication system 5, which includes the ECU and the CAN, directly or via OBD2 (On Board Diagnosis second generation) or the like, sends an instruction for measurement to each sensor unit 3 at determined timing, such as at the time of a running condition suitable for state determination, on the basis of the vehicle state data, and receives measurement data from the sensor unit 3.

The "determined timing" followed by the measurement instruction module 23 is, for example, a timing during idling, during steady running (straight running at a constant speed), during running on a stable road surface, or the like. Since each sensor unit 3 does not perform measurement at all times but performs measurement only at a time suitable for measurement, the power consumption of the sensor unit 3 side is reduced.

An interval between measurement times and/or a vehicle running condition for measurement that can be used for the determined timing followed by the measurement instruction module 23 can be optionally set and updated. The setting and update can be performed through an operation from an input device (not shown) that is implemented in the in-vehicle device 4A, the portable terminal 4B, or the like and that receives a manual input. The input device is, for example, a key switch, a touch panel provided on the screen of the display module 25, or the like.

The second information processing module 24 of the information terminal 4 determines an abnormality of a fastening state of the wheel nuts 8 according to a predetermined criterion on the basis of detection data of the strain sensors 13 that is the measurement data. The information terminal 4 determines an abnormality of the fastening state of the wheel nuts 8 for each sensor unit 3. The second information processing module 24 may have a function to determine an abnormality factor, in addition to the determination as to presence/absence of an abnormality.

The second information processing module 24 includes a second data storage unit 24a, a second signal analysis unit 24b, and a second state determination unit 24c. The second data storage unit 24a stores therein detection signals of the state detection sensor 21 such as the strain sensors 13 and other determined information that are transmitted from each sensor unit 3. The second data storage unit 24a also accumulates data of measurement in the past such that the data is associated with vehicle state data obtained at the time of the measurement. The second data storage unit 24a may be a portable storage medium such as an SD card.

The second signal analysis unit 24b performs signal analysis that is preprocessing required for determining an abnormality of the fastening state. The second state determination unit 24c determines an abnormality of the fastening state of the wheel nut 8 by using information obtained by the analysis of the second signal analysis unit 24b. The second state determination unit 24c may further identify an abnormality factor by using the information obtained by the analysis of the second signal analysis unit 24b. The abnormality factor may be identified by the second signal analysis unit 24b.

In this embodiment, in addition to the determination as to an abnormality of the fastening state of the wheel nuts 8, the second signal analysis unit 24b has a function to perform temperature drift correction of strain by using the detection temperature of the temperature sensor 14, and can detect also abnormal heat generation of the wheel 2 due to brake drag, from the detection temperature of the temperature sensor 14. The second signal analysis unit 24b further has a function to detect an abnormality such as damage of a hub bearing (not shown) and puncture of the tire 10 from detection data of the acceleration sensor 15.

More specifically, the second information processing module 24 determines an abnormality of the fastening state of the wheel fastening part 2Aa by comparing the measurement data with accumulated data that is measured for a determined item of the vehicle state data under the same condition and stored in the second data storage unit 24a in the past.

Specifically, the second signal analysis unit 24b compares a measurement data change amount at each circumferential phase in rotation of the wheel 2 with past data of each wheel assembly 2A. Next, the second state determination unit 24c determines an abnormality and infers a factor for the abnormality. By the second signal analysis unit 24b confirming the mutual relationship among a plurality of measurement data of all the wheel assemblies 2A at a certain measurement time, the second state determination unit 24c may determine an abnormality and infer an abnormality factor in consideration of a disturbance.

The abnormality factor is inferred as follows, for example.

(1) When only a limited circumferential phase of one wheel indicates an abnormality tendency, a fastening abnormality such as looseness of the wheel nut 8 or breakage of the hub bolt 7 is inferred.

(2) When all circumferential phases of only a limited wheel indicate an abnormality tendency, puncture or an abnormality of a bearing or a brake such as abnormal heat generation is inferred.

(3) When all the wheels indicate an abnormality tendency, overloading or influence of a disturbance (a road surface condition or the like) is inferred.

The server 30 serves as a database and for data processing to perform data processing at a high speed. The server 30 includes a first information processing module 32. Similarly to the second information processing module 24 of the information terminal 4, the first information processing module 32 determines an abnormality of the fastening state of the wheel fastening part by comparing measurement data transmitted from the information terminal 4 with accumulated data that is measured for the determined item of the vehicle state data under the same condition and stored in the past. Similarly to the second information processing module 24 of the information terminal 4, the first information processing module 32 includes a first data storage unit 32a, a first signal analysis unit 32b, and a first state determination unit 32c. The processing and functions performed by these first units 32a to 32c are basically the same as the respective functions and the respective processing described above for the second data storage unit 24a, the second signal analysis unit 24b, the second state determination unit 24c of the second information processing module 24, except for matters described in particular. However, the second information processing module 24 and the first information processing module 32 are different in quantity of data stored, signal analysis, quantity of past accumulated data to be used for state determination, and the like, and are also different in speed of arithmetic processing. For example, the first data storage unit 32a forms a database, stores measurement data transmitted from the information terminal 4, and further accumulates results of the determination by the first state determination unit 32c. The first data storage unit 32a also accumulates data of measurement in the past such that the data is associated with vehicle state data obtained at the time of the measurement. The description of the other functions of the server 30 is included in the following description of operation.

In the server-using determination device for the wheel fastening state according to the above embodiment, each spacer-type sensor unit 3 is installed in the wheel fastening part 2Aa in an interposed manner, and data for determining a fastening state and the like is measured. The information terminal 4 reads the vehicle state data (ON/OFF status of the power such as a start key, an engine speed, a steering angle, a tire rotational speed (vehicle speed), an accelerator position, a status of brake operation, a gear position in a transmission, and the like) from the ECU and/or the CAN, and stores measurement data of each sensor unit 3 in a running state suitable for determination that is the determined timing.

The running state suitable for determination is, for example, a running state during idling, during steady running (straight running at a constant speed), during running on a stable road surface, or the like. At the time of the running condition suitable for state determination, an instruction for activation and measurement of each sensor unit 3 may be sent from the measurement instruction module 23 in the information terminal 4 and measurement may be performed. Since measurement is not performed at all times and is performed only at the time suitable for measurement, the power consumption of the sensor unit 3 side is reduced.

When measurement data including measurement part information and a vehicle running condition is transmitted from the information terminal 4 to the server 30, the server 30 performs accumulation of each wheel data of each vehicle, analysis, and state determination.

Since measurement and determination are performed as described above, the wheel fastening state of the respective wheel fastening parts 2Aa and the state of a peripheral components of each wheel fastening part 2Aa can be monitored during running. In addition, each sensor unit 3 is easily attached to and detached from the vehicle, and thus influence thereof on the vehicle weight, the axle width, and support rigidity is small. The second information processing module 24 performs measurement in accordance with an instruction from the measurement instruction module 23. Thus, as a result of measurement being performed at the time of the designated vehicle running condition, it is possible to perform abnormality determination in which a disturbance such as influence due to a difference in running condition is reduced. In addition, to maintenance accuracy improves, determination accuracy improves, and the criterion is quantified.

Owing to use of the server 30, a large quantity of data can be accumulated, and analysis and state determination can be performed at a high speed. In addition, owing to comparison with data obtained at occurrence of a trouble of the same type or a similar type of a vehicle, or the like, it is possible to increase the accuracy of determination and factor inference.

In state determination, measurement data under the running condition at the time of measurement is compared among the phase parts and the wheels in the entire vehicle, and is also compared with past measurement data of the vehicle 1 and data obtained at occurrence of an abnormality of a similar vehicle in the past. Accordingly, the states of the wheel fastening part 2Aa and the peripheral components of the wheel fastening part 2Aa are determined, and a factor for an abnormality is inferred.

For example, when only a limited circumferential phase of one wheel indicates an abnormality tendency, a fastening abnormality such as looseness of the wheel nut 8 or breakage of the hub bolt 7 is inferred. When only a limited wheel assembly 2A indicates an abnormality tendency, puncture, an abnormality of a bearing/brake, abnormal heat generation, or the like is inferred. When all the wheel assemblies 2A indicate an abnormality tendency, overloading or influence of a disturbance (a road surface condition or the like) is inferred. Furthermore, owing to comparison with data obtained at occurrence of an abnormality of a similar type of a vehicle by a comparison and notification module 33, state determination and abnormality factor inference are allowed to be performed with high accuracy.

A result of state determination at the server 30 is transmitted to the information terminal 4 and the information terminal 4 displays the received result of state determination on the screen of the display device (not shown) by the display module 25. When an abnormality is recognized through the state to determination, not only the driver but also a vehicle management department 39 or the like is notified of the abnormality through the communication device 31. In particular, the following advantageous effects are achieved at the vehicle management department 39 of a freight company that operates a large number of the same type of vehicles.

(1) When an abnormality occurs, if there is a vehicle that has a wheel indicating a tendency similar to that of the wheel in which the abnormality occurs and that is in a situation with a similar level to that of the wheel in which the abnormality occurs, the driver of the vehicle and the operation management department are notified of the abnormality to call attention.

(2) At the operation management department, a sign of a trouble such as a wheel fastening abnormality, abnormal heat generation, or vibration can be recognized by comparing and monitoring measurement data of the wheel parts of each vehicle during running.

(3) Maintenance can be optimized on the basis of an operation condition (a running course and the like) and trouble tendency analysis for each vehicle type.

In an environment in which communication between the information terminal 4 and the server 30 is not available, the information terminal 4 can be switched to a stand-alone operation. The information terminal 4 functions to perform data accumulation, data analysis, and state determination. Therefore, the information terminal 4 can perform the same processing as in the server 30.

As soon as the information terminal 4 reaches an environment in which the above communication is available, the information terminal 4 transmits measurement data and state determination results accumulated while the above communication is not available, to the server 30.

When there is an update of the running condition suitable for state determination (that is, the running condition at the timing of a data measurement instruction), the analysis and state determination method, or the like, the information in the information terminal 4 is updated timely through wireless communication. The information terminal 4 is preferably provided with switching operation means (not shown) such that it is possible to freely switch between a server use operation and the stand-alone operation.

Figure 10:
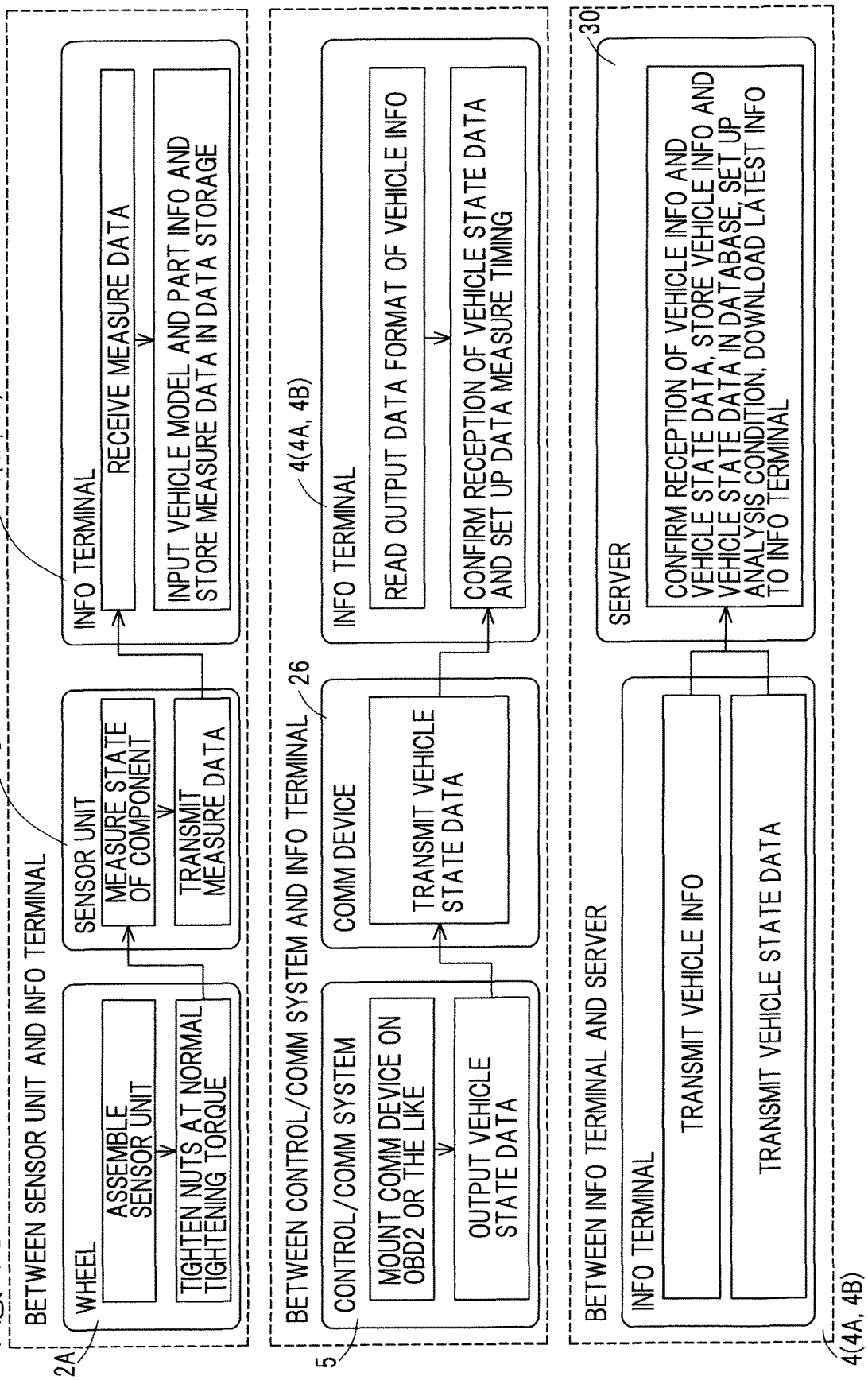
FIG. 10 is a flowchart showing flow of preparation of the server-using determination device in FIG. 1 in block form.

FIG. 10 is a diagram showing a usage method and flow indicating operation in preparation (setup) of the server-using determination device for the wheel fastening state according to the present embodiment, in block form.

First, as shown in the upper part of FIG. 10, each sensor unit 3 is assembled to the wheel assembly 2A and between the hub 6 and the wheel nut 8 (FIG. 3), and the wheel nuts 8 are tightened at normal tightening torque.

At the sensor unit 3, each built-in state detection sensor 21 (FIG. 4, FIG. 7) measures the state of a component such as the wheel 2 and transmits the measurement data to the portable terminal 4B, the in-vehicle device 4A, or the like.

The portable terminal 4B or the in-vehicle device 4A receives the measurement data from the sensor unit 3. Then, the portable terminal 4B or the in-vehicle device 4A stores inputted information about a vehicle type and/or a part and the measurement data in the second data storage unit 24a (FIG. 6) as reference data for abnormality determination. The information about the vehicle type and/or the part may be inputted through an input device unit provided to the portable terminal 4B, the in-vehicle device 4A, or the like. Alternatively, such information may be stored in the sensor unit 3 as data for initialization in advance and may be transmitted to the portable terminal 4B, the in-vehicle device 4A, or the like, and the received data may be inputted.

As shown in the middle part of FIG. 10, regarding communication between the control and communication system 5, which includes the ECU and the CAN, and the information terminal 4, the communication device 26 (FIG. 6) is mounted on the OBD2 or the like, and vehicle state data obtained during idling, during steady running, or the like is outputted from the control and communication system 5.

The communication device 26 transmits the vehicle state data to the information terminal 4.

The vehicle state data includes data such as an engine speed, a steering angle, a tire rotational speed (vehicle speed), an accelerator position, a status of brake operation, and the like.

The information terminal 4 reads the output data format of vehicle information and the like from a vehicle type database (not shown) or the like, confirms reception of the vehicle state data transmitted from the communication device 26, and sets up data measurement timing. The data measurement timing is, for example, a timing during idling or during steady running. Alternatively, a measurement interval may be set.

As shown in the lower part of FIG. 10, regarding communication between the information terminal 4 and the server 30, the information terminal 4 transmits the vehicle information to the server 30, and the server 30 stores the vehicle information in the database (not shown) thereof. The vehicle information includes information such as a vehicle model, a vehicle age, a mileage, a region, the part in which each sensor unit 3 is mounted, and the like. Then, vehicle state data is transmitted to the server 30. The vehicle state data includes data such as the data measurement timing, reference measurement data (during idling or during steady running), and the like.

The server 30 confirms reception of the vehicle information and the vehicle state data. The server 30 also stores the received data in the database, sets up an analysis condition, and causes latest information to be downloaded by the information terminal 4. The latest information includes information such as a criterion, recommended timing for data measurement, output of the OBD2, and the like. Regarding a plurality of measurement data, a problem at the time of initialization due to a fastening failure or inappropriate tire air pressure at the initial stage or the like can be detected by comparison between a plurality of phase data, comparison between a plurality of wheel data, and comparison with other vehicle data of a similar wheel or the like.

Figure 8:
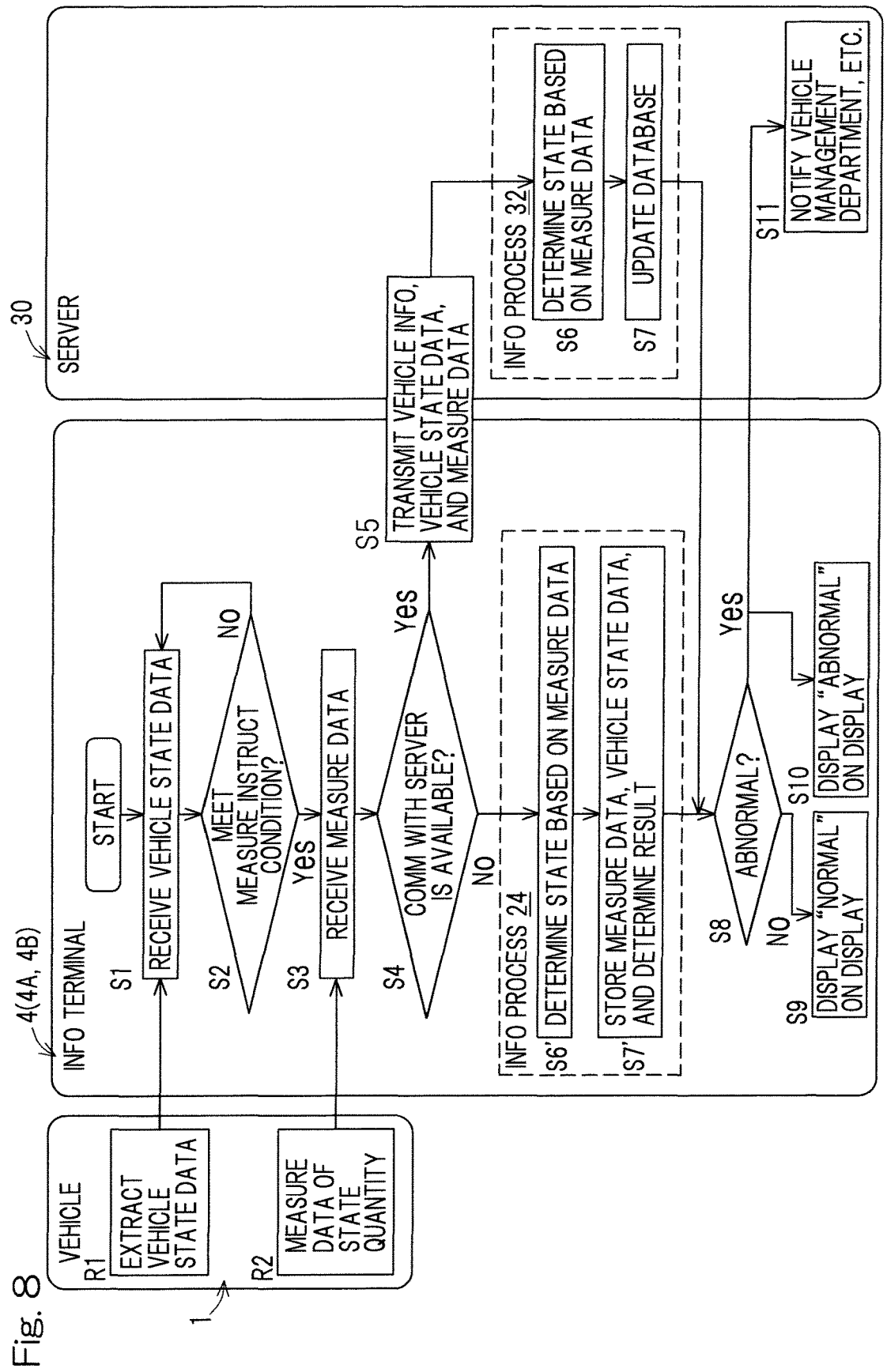
FIG. 8 is a flowchart showing flow of the entire processing of the server-using determination device in FIG. 1 in block form.
Figure 9:
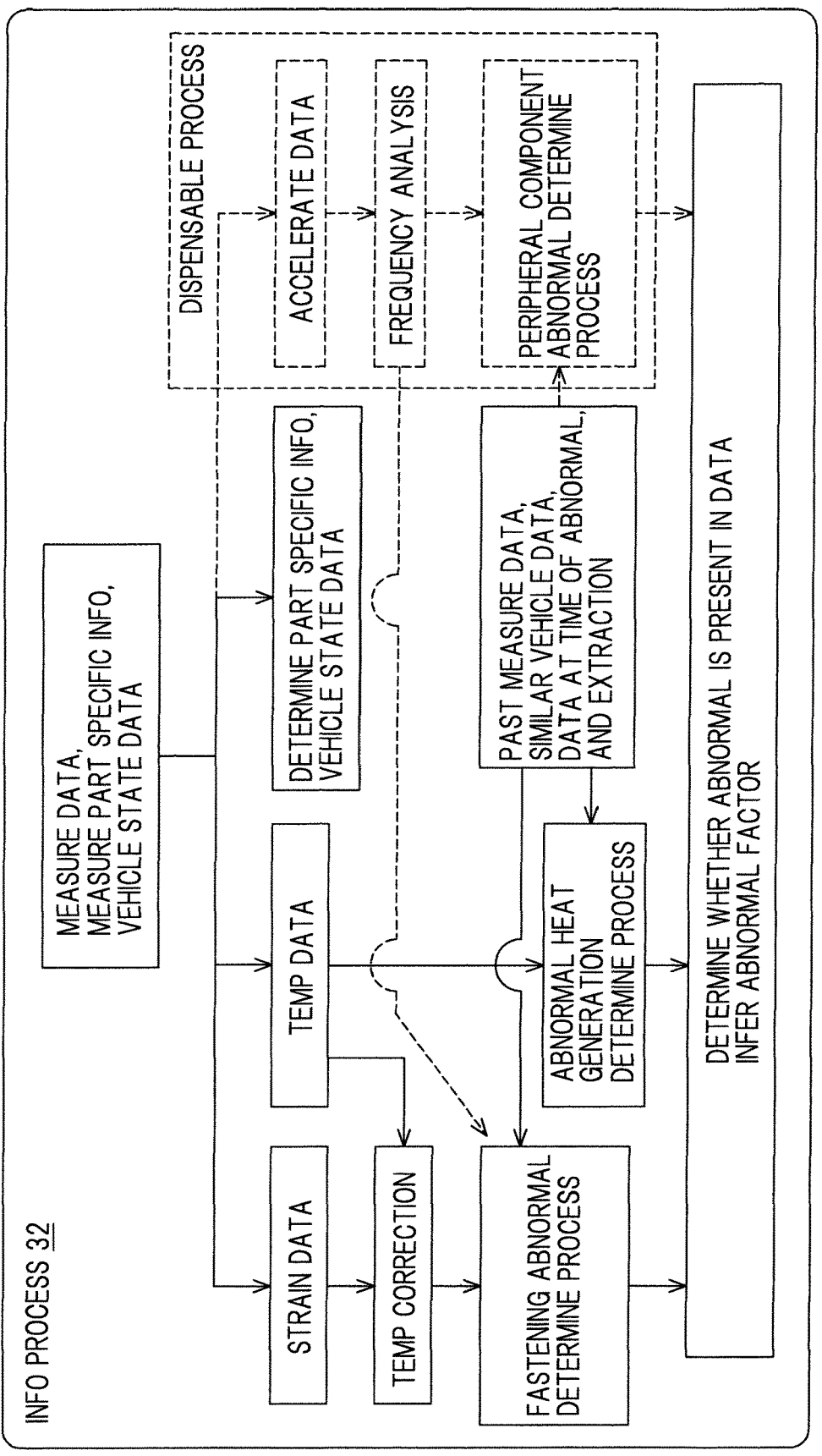
FIG. 9 is a flowchart showing flow of processing of an information processing unit of a server or the information terminal in FIG. 1 in block form.

FIG. 8 is a diagram showing a usage method and flow of operation during operation of the server-using determination device for the wheel fastening state according to the present embodiment in block form. FIG. 9 is a diagram showing a flowchart of processing performed by the first information processing module 32 of the server 30 in block form. The second information processing module 24 of the information terminal 4 and the first information processing module 32 of the server 30 basically perform the same processing. In FIG. 9, in order to clarify which component of the first information processing module 32 performs each process, it is specified by which of the first data storage unit 32a, the first signal analysis unit 32b, and the first state determination unit 32c each process is performed.

In FIG. 8, vehicle state data is extracted from the control and communication system 5 (FIG. 6), which includes the ECU and the CAN, and is transmitted to the information terminal 4 (step R1). The vehicle state data to be extracted includes data such as a tire rotational speed (vehicle speed), a steering angle, and the like. Each sensor unit 3 measures predetermined data by the mounted state detection sensor 21 (the strain sensors 13, the temperature sensor 14, and the like) (step R2). The matter to be measured includes a matter such as strain, temperature, acceleration, and the like. The sensor unit 3 performs measurement in response to an instruction from the measurement instruction module 23 (FIG. 6) of the information terminal 4. At the time of a set condition, that is, at the determined timing, the measurement instruction module 23 outputs a data measurement instruction to each sensor unit 3. The time of the set condition is, for example, a timing during idling or during straight and steady running. Each sensor unit 3 may perform measurement at a set measurement interval.

The information terminal 4, which is the portable terminal 4B, the in-vehicle device 4A, or the like, receives the vehicle state data from the control and communication system 5, which is the ECU, the CAN, and the like of the vehicle 1 (step S1), confirms whether the received data is data that meets a measurement instruction condition (step S2), and receives measurement data from each sensor unit 3 (step S3). The information terminal 4 confirms whether communication with the server 30 is available (step S4). If the communication is available, the information terminal 4 transmits the vehicle information, the vehicle state data, and the measurement data to the server 30 (step S5).

The first information processing module 32 of the server 30 performs state determination on the basis of the measurement data (step S6). The method for the state determination will be described later together with FIG. 9. After the state determination, the first information processing module 32 stores the vehicle information, the measurement data, the vehicle state data, and a determination result, and the like, and updates the database (step S7). The first information processing module 32 also transmits the determination result to the information terminal 4.

If the communication with the server 30 is not available in the above determination step S4, the second information processing module 24 of the information terminal 4 performs state determination on the basis of the measurement data (step S6'), and stores the measurement data, the vehicle state data, and a determination result in the own second data storage unit 24a (step S7').

After the above determination by the first information processing module 32 of the server 30 or the second information processing module 24 of the information terminal 4, the information terminal 4 performs processing in accordance with presence/absence of an abnormality as follows (step S8). If an abnormality is not present, "normal" is displayed on the screen of the display device (not shown) by processing of the display module 25 (FIG. 6) (step S9). If an abnormality is present, "abnormal" is displayed on the screen of the display device (step S10), and the server 30 notifies the vehicle management department and the like of the abnormality by means of an e-mail or the like.

Processing of the first information processing module 32 of the server 30 will be described with reference to FIG. 9. Processing of the second information processing module 24 of the information terminal 4 is the same as the processing of the first information processing module 32 of the server 30 shown in FIG. 9.

The first information processing module 32 of the server 30 performs the following processing by using the measurement data, measurement part specific information, the vehicle state data that are received from the information terminal 4.

Strain data (the data storage unit 32a) is temperature-corrected (the signal analysis unit 32b) on the basis of temperature data, and a fastening abnormality is determined (the state determination unit 32c) by using the corrected strain data. Abnormal heat generation is determined (the state determination unit 32c) on the basis of the temperature data (the data storage unit 32a). Past measurement data, data of a similar vehicle, and data obtained at the time of an abnormality, regarding the measurement part, are extracted (the data storage unit 32a) from the above-described inputted specific information of the measurement part (the data storage unit 32a) and are used to determine a fastening abnormality (the state determination unit 32c) and abnormal heat generation (the state determination unit 32c).

In the case where the sensor unit 3 includes the acceleration sensor 15, frequency analysis is performed (the signal analysis unit 32b) from received acceleration data (the data storage unit 32a), and an abnormality of a peripheral component of the wheel 2 is determined (the state determination unit 32c). The above-described extracted past measurement data (the data storage unit 32a) is also used for this process.

In each of the above processes of determination, it is determined whether an abnormality is present in data (the state determination unit 32c). For example, it is determined (the state determination unit 32c) whether the data exceeds a threshold, whether the data has a tendency different from those of detection data of a plurality of other strain sensors 13 provided at a plurality of other locations on the sensor unit 3, and/or whether the data has a tendency different from that of past measurement data. In addition, an abnormality factor is inferred.

The advantageous effects achieved by the server-using determination device for the wheel fastening state according to the present embodiment will be further described below.

(i) It is possible to monitor the wheel fastening state and the state of the peripheral component during running.

(ii) Owing to use of the server 30, it is possible to accumulate a large quantity of information and increase the speed of state determination.

(iii) Owing to use of the server 30, it is possible to increase the accuracy of inference of a factor for abnormality occurrence.

(iv) Owing to use of the server 30, it is possible to detect abnormality occurrence early and call attention to the same type of a vehicle in a similar state, and the like.

(v) Owing to use of the server 30, it is made possible to timely apply (update) the latest measurement condition and the latest criterion.

(vi) Owing to use of the server 30, analysis of a trouble tendency for each vehicle type can be performed.

(vii) Owing to use of the server 30, a problem at the time of initialization (a fastening failure and/or inappropriate tire air pressure from the initial stage, or the like) can be detected.

(viii) Since the sensor unit 3 is easily attached to or detached from the vehicle 1, influence of the sensor unit 3 on the vehicle weight, the axle width, and support rigidity is small.

(ix) Owing to vehicle running condition designation at the time of measurement, it is possible to perform abnormality determination in which influence of a disturbance is reduced.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . vehicle
2A . . . wheel
2Aa . . . wheel fastening part
3 . . . sensor unit
4 . . . information terminal
5 . . . control and communication system (control system or communication system)
22 . . . communication device (communication interface)
30 . . . server
32 . . . first information processing module

What is claimed is:

1. A server-using device for determining a wheel fastening state, comprising:
a sensor unit detachably installed in a wheel fastening part at which a wheel assembly is fastened to an axle of a vehicle, the sensor unit being configured to detect a state quantity depending on a fastening state of the wheel fastening part;
an information terminal connected to the sensor unit; and
a server connected to the information terminal, wherein
the information terminal includes
a measurement instruction module configured to read vehicle state data regarding the vehicle from a control and communication system of the vehicle and send an instruction for measurement to the sensor unit at timing for which the vehicle state data is taken into consideration, and
a communication interface for receiving measurement data from the sensor unit and transmitting the measurement data to the server, and
the server includes
a first information processing module configured to determine an abnormality of the fastening state of the wheel fastening part by comparing the measurement data with accumulated data that is measured for a determined item of the vehicle state data under the same condition and stored in the past.

2. The server-using device as claimed in claim 1, further comprising communication devices for wirelessly performing communication between the sensor unit and the information terminal and communication between the information terminal and the server, wherein
the first information processing module stores the measurement data and determines the abnormality, and
the information terminal includes a display module configured to display a determination result transmitted from the server, on a screen of a display device.

3. The server-using device as claimed in claim 1, wherein the information terminal includes a second information processing module configured to determine an abnormality of the fastening state of the wheel fastening part based on the measurement data by using the vehicle state data.

4. The server-using device as claimed in claim 1, wherein the server includes
a comparison and notification module configured to: when an abnormality occurs in the vehicle, compare measurement data from which the abnormality is determined, with measurement data of another vehicle; and, if a situation with a similar tendency or a similar level is found between both measurement data as a result of the comparison, notify a vehicle management department or a driver of the vehicle of vehicle information of the other vehicle to call attention.

5. The server-using device as claimed in claim 1, wherein the sensor unit includes:
a ring spacer provided over an entire periphery of the wheel assembly and interposed between respective head portions of a plurality of hub bolts and a plurality of wheel nuts associated with the respective hub bolts so as to receive tightening force by the plurality of hub bolts and the plurality of wheel nuts, the spacer having a plurality of bolt holes that are formed at a plurality of circumferential phase parts, respectively, the plurality of hub bolts being inserted through the plurality of bolt holes, respectively, to mount a wheel of the wheel assembly to a hub, the ring spacer being deformable due to the tightening force; and
at least one strain sensor provided between at least two bolt holes of the plurality of bolt holes, the at least one strain sensor being configured to measure strain of the deformed spacer.

6. The server-using device as claimed in claim 5, wherein the strain sensor, a communication device, and a power source are provided on the spacer and at a circumferential phase part between the at least two bolt holes, the communication device being configured to communicate a detection signal of the strain sensor, the power source being configured to supply power to the strain sensor and the communication device.

7. The server-using device as claimed in claim 5, wherein the circumferential phase part between the bolt holes is formed with a thin portion.

8. The server-using device as claimed in claim 7, wherein the spacer includes a thinnest portion at a portion of the circumferential phase part formed with the thin portion between the at least two bolt holes, and the at least one strain sensor measures strain of the thinnest portion, the thinnest portion serving as a strain concentration portion.

9. The server-using device as claimed in claim 5, wherein the sensor unit further includes:
   a temperature sensor; and
   at least any one of an acceleration sensor, a gyro sensor, and a rotation sensor.

10. The server-using device as claimed in claim 5, wherein the at least one strain sensor includes: a diaphragm mounted on the spacer, the diaphragm being deflectable in response to deformation of the spacer; and a sensor element mounted on the diaphragm, the sensor element being configured to measure deflection of the diaphragm.

11. A server-using device for determining a wheel fastening state comprising:
   a sensor unit detachably installed in a wheel fastening part at which a wheel assembly is fastened to an axle of a vehicle, the sensor unit being configured to detect a state quantity depending on a fastening state of the wheel fastening part;
   an information processing terminal connected to the sensor unit so as to allow transmission and reception of a signal, the information processing terminal including a first processor; and
   a server connected to the information terminal so as to allow transmission and reception of a signal, the server including a second processor, wherein
   the first processor is programmed
      to read vehicle state data regarding the vehicle from a control and communication system of the vehicle and send an instruction for measurement to the sensor unit at timing for which the vehicle state data is taken into consideration, and
      to receive measurement data from the sensor unit and transmit the measurement data to the server, and
   the second processor is programmed to determine an abnormality of the fastening state of the wheel fastening part by comparing the measurement data with accumulated data that is measured for a determined item of the vehicle state data under the same condition and stored in the past.

\* \* \* \* \*

UNITED STATES PATENT AND TRADEMARK OFFICE
CERTIFICATE OF CORRECTION

PATENT NO.         : 10,408,709 B2                                      Page 1 of 1
APPLICATION NO.    : 15/815244
DATED              : September 10, 2019
INVENTOR(S)        : Yasutaka Kusumi et al.

It is certified that error appears in the above-identified patent and that said Letters Patent is hereby corrected as shown below:

On the Title Page

Item (57), On Line 9 of the Abstract, before "measurement" delete "to".

Signed and Sealed this
Twelfth Day of November, 2019

Andrei Iancu
*Director of the United States Patent and Trademark Office*